Figures 1, 2:
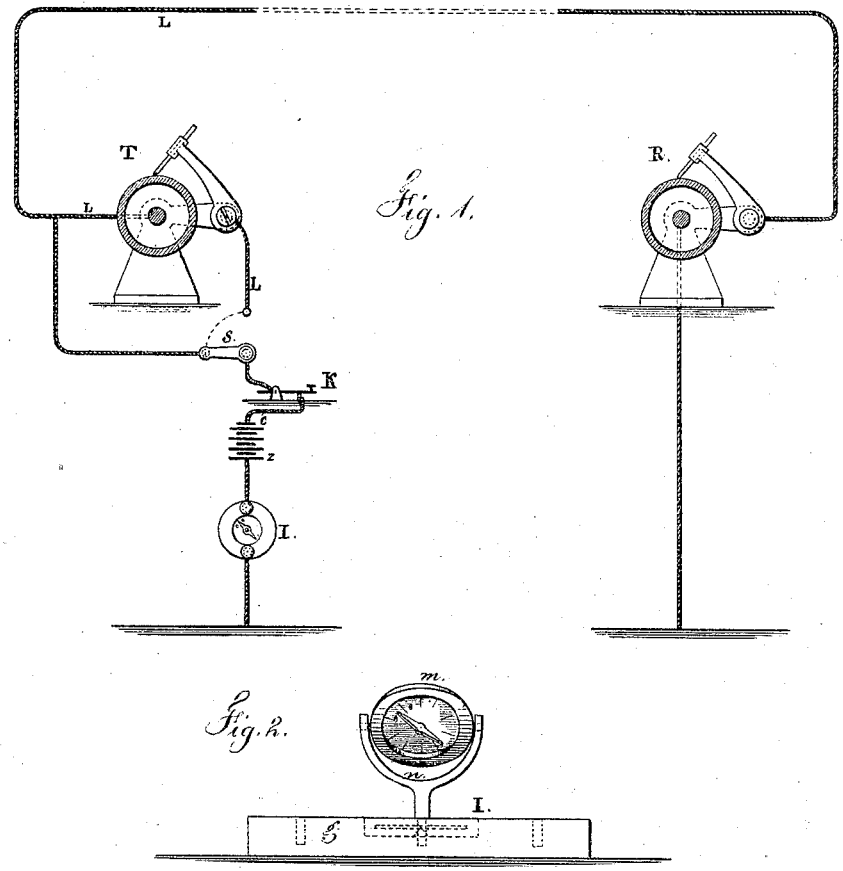

G. LITTLE.

Improvement in Indicators for Telegraph Circuits.

No. 130,813. Patented Aug. 27, 1872.

Witnesses
Chas H Smith
Geo D Walker

Inventor
George Little
Lemuel W. Serrell
atty

UNITED STATES PATENT OFFICE.

GEORGE LITTLE, OF RUTHERFORD PARK, NEW JERSEY.

IMPROVEMENT IN INDICATORS FOR TELEGRAPH-CIRCUITS.

Specification forming part of Letters Patent No. 130,813, dated August 27, 1872.

*To all whom it may concern:*

Be it known that I, GEORGE LITTLE, of Rutherfork Park, in the county of Bergen and State of New Jersey, have invented an Improvement in Automatic Telegraphic Circuits; and the following is declared to be a correct description of the same.

In connecting the battery to the automatic transmitting instrument, in which a strip of perforated paper is used to make and break the circuit, it is usual to allow the metallic circuit to extend from the positive or $c$ of the battery to the stylus, thence through the roller to the bed of the machine and the line-wire to the distant receiving-instrument; thence the circuit is completed through the earth and connection to the negative or $z$ of the battery. In arranging the connections in this manner the line is positive and the earth connection negative. I have, however, reversed the connections, so that the battery at the distant station was employed; and this reversing of the currents is common in many telegraph systems, such as the Wheatstone, &c.

My present invention is made for two objects: the first to determine, as far as possible, whether the line is in working order; and the second to facilitate signaling the distant station.

I make use of an indicating instrument at the negative side of the battery in the earth-connection, to show whether the line is in working order, as far as possible, and I place a finger-key between the transmitting instrument on the line-wire and the battery so as to signal the distant station.

In the drawing, Figure 1 is a diagram illustrating the connections and instruments, and Fig. 2 is an elevation of the signaling galvanometer.

The transmitting instrument T is of usual character, consisting of a roller over which the perforated paper is drawn beneath a stylus. The receiving instrument R is similar, only the chemically-prepared paper is employed, or else a recording pen or instrument of other known character. The battery $c\ z$ is of any usual kind, and the self-closing finger-key K is employed between the battery and the line-wire L, and a switch may be used at $s$ to avoid sending signal pulsations through the transmitting instrument. In the connection between the battery and the earth is the indicating instrument I, that is employed in connection with either the finger-key or the transmitting instrument to show whether the pulsation is properly transmitted and returns by the earth-connection.

Of course, if there should be a leak or imperfect insulation of the wire there would be a return or ground current, but, presuming the insulation to be in order, there could not be any indication at the instrument I unless the pulsation reached the distant station; hence the operator, by the finger-key call, or by the transmitter, can communicate with the distant station, and, by the instrument I, learn that connections are complete at the receiving-station, and hence, when the message is sent, the instrument I will indicate its reception; and if, during the transmission of the message, the indication at I is interrupted, the transmission can be stopped and the defect removed.

This instrument I may be a receiving instrument, and the message thereby will be repeated back; but this will be an unnecessary expense, because in the automatic system the perforated paper cannot send pulsations incorrectly; and if the line is in order, so that there will be a return current, the pulsations will be properly given at the receiving-station, and the operator there must adjust his instrument so as to prevent the marks being too heavy and running into each other. I therefore prefer that the instrument I be a galvanometer.

The operator's table requires to be as clear and free as possible where the message is received or written out. If the galvanometer is placed too far back on the table, its needle cannot easily be observed, especially with the instruments where the needle is upon a vertical pivot. To enable the operator to see his galvanometer when placed toward the back of the table out of the way, I make use of a movable mirror, $m$, set in a yoke, $n$, that is inserted in one of a number of holes around the wooden rim of the galvanometer $g$, so as to accommodate the operator at his seat when the galvanometer is adjusted to the meridian line, and by swinging the mirror m upon the horizontal and vertical axes the needle will be reflected clearly and its vibrations observed so as to enable the operator to tell whether the message is being properly transmitted or not.

I claim as my invention—

The movable mirror m upon the yoke n, in combination with the galvanometer, as and for the purposes set forth.

Signed by me this 4th day of January, 1872.

GEO. LITTLE.

Witnesses:
   GEO. T. PINCKNEY,
   CHAS. H. SMITH.